(12) United States Patent
Kim et al.

(10) Patent No.: US 8,374,353 B2
(45) Date of Patent: Feb. 12, 2013

(54) METHOD AND APPARATUS FOR UPDATING A GROUP KEY

(75) Inventors: Dae Youb Kim, Seoul (KR); Mi Suk Huh, Suwon-si (KR); Tae-Chul Jung, Seongnam-si (KR); Hwan Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1282 days.

(21) Appl. No.: 11/819,604

(22) Filed: Jun. 28, 2007

(65) Prior Publication Data

US 2008/0075286 A1  Mar. 27, 2008

(30) Foreign Application Priority Data

Sep. 27, 2006  (KR) .................. 10-2006-0094324

(51) Int. Cl.
*G06F 21/00* (2006.01)
(52) U.S. Cl. ...................... 380/273; 713/163
(58) Field of Classification Search ............. 713/163; 380/273
See application file for complete search history.

(56) References Cited

U.S. PATENT DOCUMENTS

| | | | | |
|---|---|---|---|---|
| 5,592,552 A * | 1/1997 | Fiat | | 713/163 |
| 6,049,878 A * | 4/2000 | Caronni et al. | | 726/3 |
| 6,240,188 B1 | 5/2001 | Dondeti et al. | | |
| 6,263,435 B1 * | 7/2001 | Dondeti et al. | | 713/163 |
| 6,684,331 B1 * | 1/2004 | Srivastava | | 713/163 |
| 7,043,024 B1 * | 5/2006 | Dinsmore et al. | | 380/278 |
| 7,212,634 B2 * | 5/2007 | Briscoe | | 380/203 |
| 7,269,728 B1 * | 9/2007 | Li | | 713/163 |
| 7,395,425 B2 * | 7/2008 | Nakano et al. | | 713/163 |
| 7,450,722 B2 * | 11/2008 | Medvinsky | | 380/277 |
| 7,627,755 B2 * | 12/2009 | Ahonen et al. | | 713/163 |
| 7,721,089 B2 * | 5/2010 | Gentry et al. | | 713/163 |
| 2004/0114762 A1 | 6/2004 | Medvinsky | | |
| 2005/0114650 A1 | 5/2005 | Rockwood et al. | | |

FOREIGN PATENT DOCUMENTS

| | | |
|---|---|---|
| KR | 10-2004-0004592 | 1/2004 |
| KR | 10-2004-0088365 | 10/2004 |
| KR | 10-2005-0089736 | 9/2005 |

OTHER PUBLICATIONS

Bruce Schneier, Applied Cryptography, 1996, John Wiley & Sons Inc., Second Edition, pp. 351-352.*
"Distributed Collaborative Key Agreement and Authentication Protocols for Dynamic Peer Groups"; Ratrick P. C. Lee et al.; pp. 1-15.
Batch Rekeying in Mykil Key Management System; Wesley Willett et al.; Department of Computer Science; pp. 1-6.

* cited by examiner

*Primary Examiner* — Benjamin Lanier
(74) *Attorney, Agent, or Firm* — NSIP Law

(57) ABSTRACT

A method and apparatus for updating a group key of a group corresponding to a binary tree are provided. The method includes updating keys of leaf nodes that correspond to new members, in response to a join of at least two new members joining the group; determining whether both of two child nodes of a single ancestor node are updated when updating a key of the single ancestor node of the leaf nodes; establishing one of the two child nodes as an update use node when both the two child nodes are updated; and updating a key of the ancestor node using the updating node. Thus, the group key may be effectively updated with respect to multi-join.

21 Claims, 8 Drawing Sheets

METHOD AND APPARATUS FOR UPDATING A GROUP KEY

CROSS-REFERENCE TO RELATED APPLICATION

This application claims the benefit under 35 U.S.C. §119(a) of Korean Patent Application No. 10-2006-0094324, filed on Sep. 27, 2006, in the Korean Intellectual Property Office, the entire disclosure of which is hereby incorporated by reference.

BACKGROUND OF THE INVENTION

1. Field of the Invention

The present invention relates to a method and an apparatus for updating a group key of group members. More particularly, the present invention relates to a method and apparatus for effectively updating a group key of group members when at least two new members simultaneously join the group.

2. Description of Related Art

Contents which are provided to group members are typically encrypted, so that other users can not use the contents. Accordingly, all of the group members should have an encryption key, provided from the server, capable of decoding the encrypted contents.

Accordingly, updating an encryption key is an important issue. For example, when a new member joins a group, the group is required to allow the new member to restrictively access contents. Later, after the new member joins the group, when the existing group members update the encryption key, the new member may share the updated key.

Also, when one of the existing group members leaves the group, the group key, used by all group members before the leaving member leaves the group, is required to be updated so that the leaving member no longer has access to the contents.

Generally, methods of updating the group key are performed in two ways.

In one method, a server calculates an updated key and transmits the updated key to a member requiring the updated key, when it is required to update a group key. This method is problematic due to the great burden placed upon the server since the server is required to calculate the group key for all group members who require the updated group key, and then transmit the calculated group key.

In another method, members that are capable and require the update voluntarily calculate the group key and perform a required update, while the server transmits the updated key to only those members incapable of performing a self-update when it is required to update the group key. In the case of this method, the burden placed upon the server is not great since the server calculates to transmit the updated group key to only those members incapable of performing the self-update. However, it is quite difficult for the members that require the update to effectively self-update the group key.

Further, group key updating is more complex when at least two members simultaneously join the group, and the problem of repeatedly updating an updated key may occur.

Accordingly, there is a need for an improved method and apparatus for effectively updating the group key to be capable of performing a self-update.

SUMMARY OF THE INVENTION

Exemplary embodiments of the present invention address at least the above problems and/or disadvantages and provide at least the advantages described below. Accordingly, an aspect of exemplary embodiments of the present invention provides a method and an apparatus capable of effectively performing a self-update.

An aspect of exemplary embodiments of the present invention also provides a method and an apparatus capable of simultaneously updating a group key by accumulating a predetermined number of join requests, or by accumulating the join requests for a predetermined time.

An aspect of exemplary embodiments of the present invention also provides a method and an apparatus capable of effectively providing a group member of a contents server, incapable of performing a self-update, with a required group key.

An aspect of exemplary embodiments of the present invention also provides a method and an apparatus capable of effectively selecting a node which requires a self-update, and performing an update of a group key with respect to the selected node.

According to an aspect of exemplary embodiments of the present invention, there is provided a method of updating a group key of a group corresponding to a binary tree, the method including updating keys of leaf nodes which correspond to new members in response to a join of at least two new members joining the group; determining whether both of two child nodes of a single ancestor node are updated when updating a key of the single ancestor node of the leaf nodes; establishing one of the two child nodes as an update use node when both the two child nodes are updated; and updating a key of the ancestor node using the updating node.

An aspect of exemplary embodiments of the present invention provides for establishing one of the two child nodes as the updating node after comparing node identification (ID) numbers of the two child nodes.

Another aspect of exemplary embodiments of the present invention provides that the method of updating the group key may further include encrypting the key of the ancestor node to transmit to a group member corresponding to a node other than the update use node.

According to another aspect of exemplary embodiments of the present invention, there is provided an apparatus for updating a group key of a group corresponding to a binary tree, the apparatus including an update determination unit for determining whether two child nodes of a single ancestor node are both updated when updating a key of the ancestor node of the leaf nodes, in response to at least two new members joining the group; an update use node determination unit for determining one of the two child nodes as the update use node when the two child nodes are both updated; and a key update unit for updating the key of the ancestor node using the update use node.

Another aspect of exemplary embodiments of the present invention provides that the at least two new members join the group via a batch processing.

Another aspect of exemplary embodiments of the present invention provides that the apparatus for updating the group key may further include a key transmitting unit for encrypting the key of the ancestor node to transmit to a group member corresponding to a node other than the update use node.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
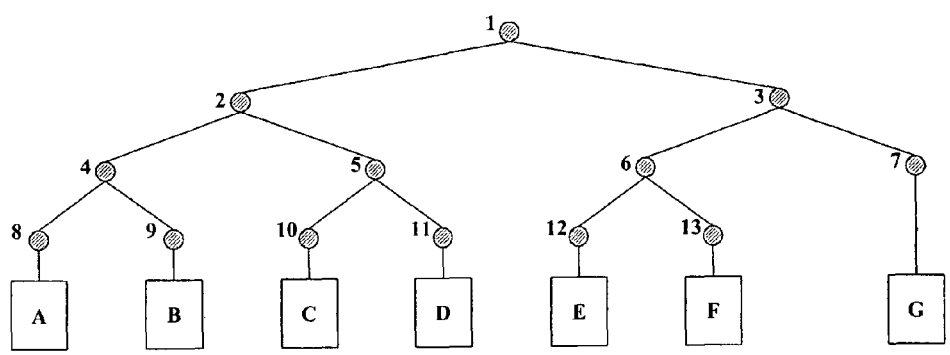
FIG. 1 is a diagram illustrating a binary tree corresponding to an example of a group according to an exemplary embodiment of the present invention.

FIG. 1 is a diagram illustrating a binary tree corresponding to an example of a group according to an exemplary embodiment of the present invention.

Referring to FIG. 1, group members A, B, C, D, E, F, and G respectively correspond to each leaf node of the binary tree.

In this case, each of the group members A, B, C, D, E, F, and G may correspond to a device or a user.

Each leaf node of the binary tree has its own encryption key.

A key of a root node is used for transmitting contents. Namely, the contents, which are transmitted from a server, are encrypted to be transmitted to the key of the root node.

In the binary tree, a key corresponding to nodes, other than the root node, is used for updating a node key. In an exemplary embodiment of the present invention, the key corresponding to nodes, other than the root node, is used for updating a key of a parent node of a corresponding node.

A key of the leaf node may be established as a member key of a corresponding member.

Each of the group members A, B, C, D, E, F, and G stores a node key of all nodes on a path from the leaf node to the root node.

Specifically, the member A stores the node key of node 8, node 4, node 2 and node 1. Also, the member F stores the node key of node 13, node 6, node 3 and node 1.

Figure 2:
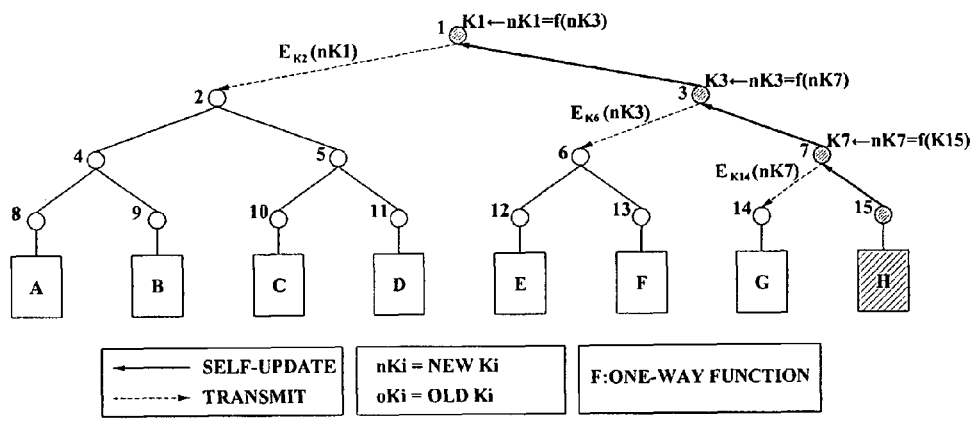
FIG. 2 is a diagram illustrating the binary tree of FIG. 1 when a new member joins the group of FIG. 1.

FIG. 2 is a diagram illustrating the binary tree when a new member joins the group of FIG. 1.

In FIG. 2, a thick line indicates a self-update path and a dotted line indicates an update path transmitted from a server.

Referring to FIG. 2, node 7 is split to generate nodes 14 and 15 when a new group member H joins the group. In this case, a node corresponding to a member G changes from node 7 to node 14.

Node 15 becomes a node corresponding to the new member H.

When a new member joins the group, the split node is determined as a node, having a node ID that is a minimum or a maximum, when the binary tree is a complete binary tree. Also, when the new member joins the group, the split node is selected as a node where a depth of the leaf nodes is minimum, and is determined as a node, having a node ID that is a minimum or a maximum from the selected node, when the binary tree is not a complete binary tree.

Node 15, corresponding to the new member H, is determined as an updating start node when the new member H joins the group.

A node key of the update start node 15 is established as a member key of the member H. The member key may be shared by a server and a member before updating the node key. When the node key of node 15 is determined, a node key of node 7 is updated using the node key of node 15. In this case, the node key of node 7 may be established as an output of a one-way function with respect to the node key of node 15. As an example, assuming that the node key of node 15 is K15, an update value nK7 of the node key K7 of the node 7 may be established as f(K15). In this case, f( ) indicates the one-way function. In addition to the node key values, updating information values, such as an update date and a number of updates, are included in input values of the function f. Hereinafter, f(K) indicates f(K, update information).

Also, when the node key of node 7 is updated, a node key of node 3 is updated using the node key of node 7. In this case, the node key of node 3 may be established as an output of the one-way function with respect to the key of node 7. As an example, assuming that the node key of node 7 is K7, an update value nK3 of node key K3 of node 3 may be established as f(K7).

Also, when the node key of node 3 is updated, a node key of node 1 is updated using the node key of node 3. In this case, the node key of node 1 may be established as an output of the one-way function with respect to the node key of node 3. As an example, assuming that the node key of node 3 is K3, an update value nK1 of node key K1 of node 1 may be established as f(K3).

Consequently, as illustrated in FIG. 2, a self-update is performed along a path from node 15 through node 1, passing through nodes 7 and 3.

In this case, the server encrypts the updated key of node 7 to transmit to the member G corresponding to node 14 since the member G does not know the updated key of node 7. In this case, the updated key of node 7 is encrypted to transmit to node 14. The member G which has received the key of node 7 may sequentially calculate the keys of nodes 1 and 3 using the one-way function.

Also, the server may encrypt the updated key of node 3 to transmit to the members E and F corresponding to the descendent nodes of node 6 since the members E and F do not know the updated key of node 3. In this case, the key of updated node 3 is encrypted to transmit to node 6. In this case, the members E and F, which have received the key of node 3, may calculate the key of node 1 using the one-way function.

Also, the server may encrypt the updated key of node 1 to transmit to the members A, B, C, and D corresponding to the descendent nodes of node 2 since the members A, B, C, and D do not know the updated key of node 1. In this case, the updated key of node 1 is encrypted to transmit to node 2. Due to a feature of the one-way function, the members A, B, C, and D corresponding to the descendent nodes of node 2 do not know the keys of nodes 3, 7 and 15 using the updated key of node 1.

Figure 3:
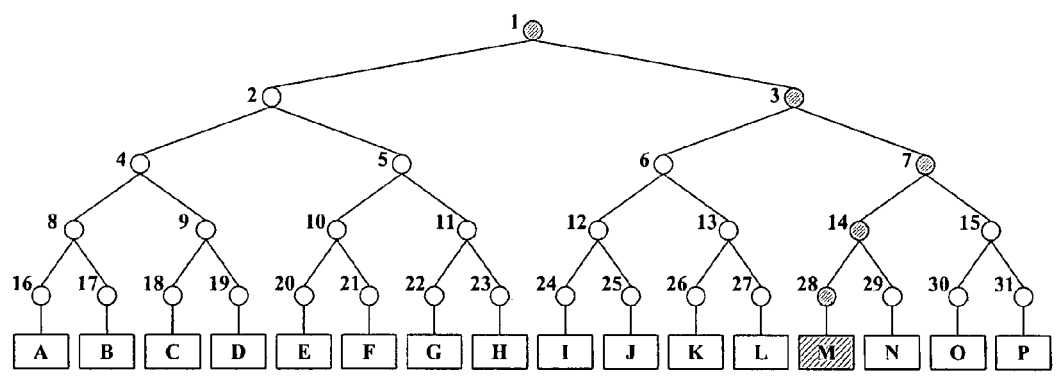
FIG. 3 is a diagram illustrating a binary tree corresponding to another example of a group according to an exemplary embodiment of the present invention.

FIG. 3 is a diagram illustrating a binary tree corresponding to another example of a group according to an exemplary embodiment of the present invention.

Referring to FIG. 3, a self-update path which connects nodes 14, 7, 3, and 1 is established when an existing member M of the group leaves the group.

In this case, node 14 is established as an update start node, and a node key update is performed along parent nodes, from node 14 to a root node.

Figure 4:
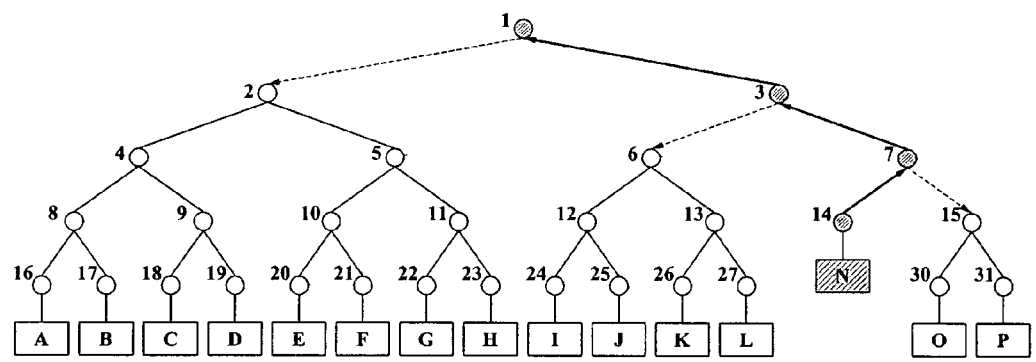
FIG. 4 is a diagram illustrating a binary tree when an existing group member leaves the group of FIG. 3.

FIG. 4 is a diagram illustrating the binary tree when an existing group member leaves the group of FIG. 3.

Referring to FIG. 4, when the member M leaves the group, nodes 28 and 29 are deleted, and node 14 becomes a node corresponding to a member N. In this case, node 14 becomes an update start node.

A key of node 14 is established as a member key of the member N. An updating process of a self-update path that follows from node 14, node 7, node 3 and node 1 is identical as illustrated through FIGS. 1 and 2.

Namely, a key of node 7 is updated using a key of node 14. In this case, the key of node 7 may be established as an output of the one-way function with respect to the key of node 14. As an example, assuming that the node key of node 14 is K14, an update value nK7 of the node key K7 of node 7 may be established as f(K14). In this case, f( ) indicates the one-way function.

Also, when the node key of node 7 is updated, a node key of node 3 is updated using the node key of node 7. As an example, assuming that the node key of node 7 is K7, an update value nK3 of the node key K3 of node 3 may be established as f(K7).

Also, when the node key of node 3 is updated, the node key of node 1 is updated using the node key of node 3. In this case, a node key of node 1 may be established as an output of the one-way function with respect to the node key of node 3. As an example, assuming that the node key of node 3 is K3, an update value nK1 of the node key K1 of node 1 may be established as f(K3).

In this case, a server may encrypt the updated key of node 7 to transmit to members O and P corresponding to descendent nodes of node 15 since the members O and P do not know the updated key of node 7. In this case, the updated key of node 7 is encrypted to transmit to node 15. The members O and P which have received the key of node 7 may sequentially calculate the keys of the 1 and 3 using the one-way function.

Also, the server may encrypt the updated key of node 3 to transmit to members I, J, K, and L corresponding to descendents nodes of node 6 since the members I, J, K, and L do not know the updated key of node 3. In this case, the updated key of node 3 is encrypted to transmit to node 6. The members I, J, K, and L which have received the key of node 3 may calculate the key of node 1 using the one-way function.

Also, the server may encrypt an updated key of node 1 to transmit to members A through H corresponding to descendent nodes of node 2 since the members A through H do not know the updated key of node 1. In this case, the updated key of node 1 is encrypted to transmit to node 2

Consequently, according to an exemplary embodiment of the present invention, when the method of updating a group is used, and when a number of a group member is N, a transmission quantity corresponds to approximately log 2N−1, and a storage quantity corresponds to approximately log 2N.

Figure 5:
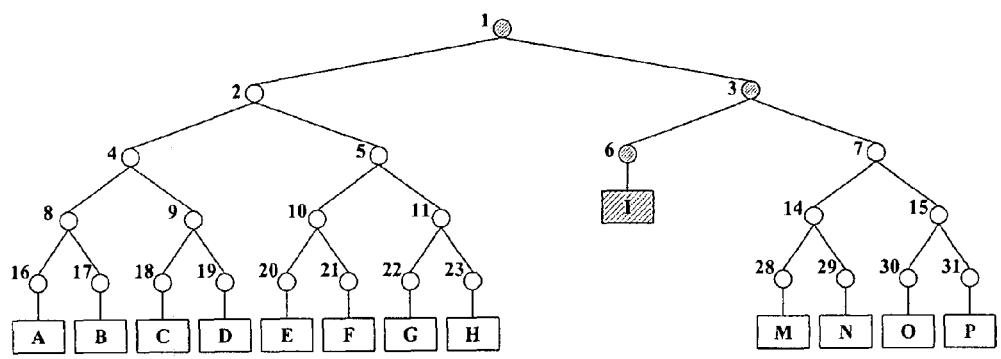
FIG. 5 is a diagram illustrating a binary tree corresponding to a still another example of a group according to an exemplary embodiment of the present invention.

FIG. 5 is a diagram illustrating a binary tree corresponding to a still another example of a group according to an exemplary embodiment of the present invention.

Referring to FIG. 5, a self-update path which connects node 3 and 1 is established when an existing member I leaves the group.

In this case, node 3 is established as an update start node, a node key update is performed along parent nodes, from node 3 to a root node.

Figure 6:
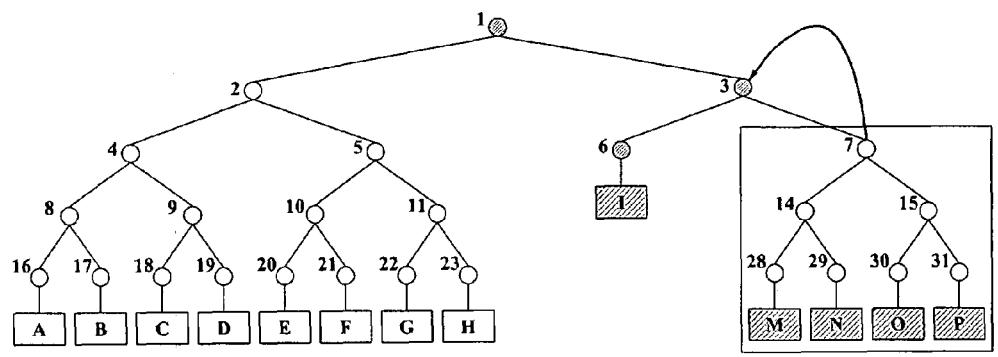
FIG. 6 is a diagram illustrating a change of the binary tree when an existing member leaves the group of FIG. 5

FIG. 6 is a diagram illustrating a change of the binary tree when the existing member leaves the group of FIG. 5.

Referring to FIG. 6, node 3, that is a parent node of node 6 which corresponds to the member I, is replaced with node 7 when the existing member I leaves the group.

Namely, node 7, that is a child node of parent node 3, replaces the parent node 3 of node 6 which corresponds to the leaving member I.

Figure 7:
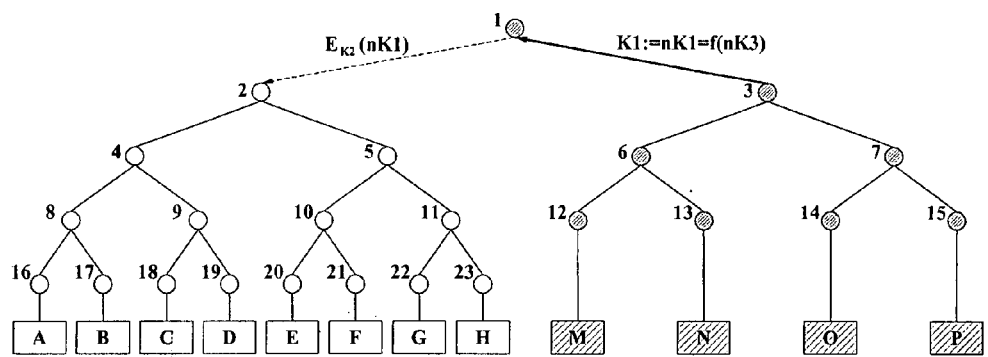
FIG. 7 is a diagram illustrating the binary tree corresponding to a result when the existing member leaves the group of FIG. 5.

FIG. 7 is a diagram illustrating the binary tree corresponding to a result when the existing member leaves the group of FIG. 5.

Referring to FIG. 7, a location of node 7 of FIG. 5 is changed to a location of node 3, a location of node 14 of FIG. 5 is changed to a location of node 6, a location of node 15 of FIG. 5 is changed to a location of node 7, a location of node 28 of FIG. 5 is changed to a location of node 12, a location of node 29 of FIG. 5 is changed to a location of node 13, a location of node 30 of FIG. 5 is changed to a location of node 14, and a location of node 31 of FIG. 5 is changed to a location of node 15.

In this case, a node key of node 3 is replaced as the node key before its change of node 7, a node key of node 6 is replaced as a node key before its change of node 14, the node key of node 7 is replaced as a node key before its change of node 15, a node key of node 12 is replaced as a node key before its change of node 28, a node key of node 13 is replaced as a node key before its change of node 29, a node key of node 14 is replaced as a node key before its change of node 30, and a node key of node 15 is replaced as a node key before its change of node 31.

When the node key of node 3, that is the update start node, is replaced as the node key before its change of node 7, the node key of node 1 is updated using the updated node key nK3 of node 3. Namely, an output of a one-way-function with respect to the updated node key nK3 of node 3 is updated as the node key of node 1.

In this case, members A through H corresponding to descendent nodes of node 2 are provided the node key of node 1 from a server. In this case, the updated node key of node 1 is encrypted to be transmitted to node 2.

As described above, a tree size of the binary tree which corresponds to the group may vary according to a number of members, or the tree size may be fixed regardless of the number of the member. Namely, the binary tree which corresponds to the group may be a complete tree and fixed with its depth, and a leaf node of the complete binary tree may be divided into a subscribed node having a corresponding member and an unsubscribed node without the corresponding member.

In this case, assuming that the entire number of the members is N, the server configures a binary tree having a depth of log 2N, and each member is required to store log 2N key from the start.

Figure 8:
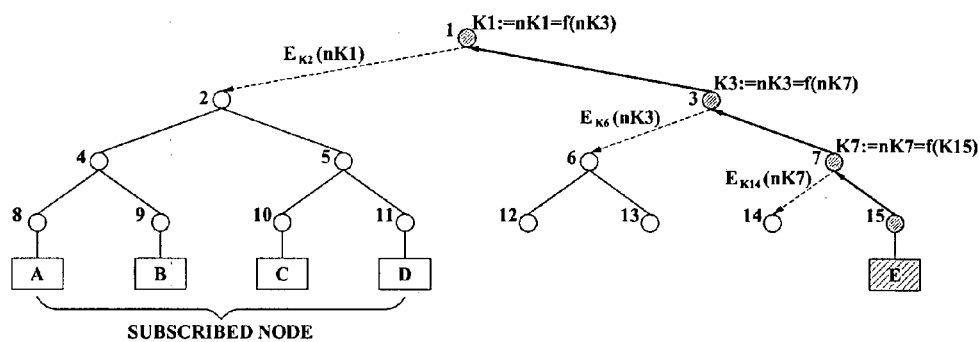
FIG. 8 is a diagram illustrating a group corresponding to an example of a fixed binary tree.

FIG. 8 is a diagram illustrating a group corresponding to an example of a fixed binary tree.

Referring to FIG. 8, nodes 8, 9, 10, and 11 respectively correspond to a joining node of members A, B, C, and D, nodes 12, 13, 14, and 15 correspond to disjoin nodes, and the member E newly joins to the group to be allocated to node 15.

In this case, node 15 is established as an update start node, and a node key of node 15 is established as a member key of the member E.

When the node key of node 15 is established, the node key of node 7 is updated using the node key of node 15. In this case, the node key of node 7 is established as an output of a one-way function with respect to the node key of node 15. As an example, assuming that the node key of node 15 is K15, an update value nK7 of the node key K7 of node 7 may be established as f(K15). In this case, f( ) indicates the one-way function.

Also, when the node key of node 7 is updated, a node key of node 3 is updated using the node key of node 7. In this case, the node key of node 3 may be established as an output of the one-way function with respect to the key of node 7. As an example, assuming that the node key of node 7 is K7, an update value nK3 of the node key K3 of node 3 may be established as f(K7).

Also, when the node key of node 3 is updated, a node key of node 1 is updated using the node key of node 3. In this case, the node key of node 1 may be established as an output of the one-way function with respect to the node key of node 3. As an example, assuming that the node key of node 3 is K3, an update value nK1 of the node key K1 of node 1 may be established as f(K3).

Consequently, as illustrated in FIG. 8, a self-update is performed along a path from node 15 through node 1, passing through nodes 7 and 3.

In this case, a server may not encrypt to transmit the node key of node 7 since there is no member corresponding to node 14.

Also, the server may not encrypt to transmit an updated key of node 3 since there is no member corresponding to a descendent node of node 6.

The server may encrypt an updated key of node 1 to transmit to the members A, B, C, and D corresponding to descendent nodes of node 2 since the members A, B, C, and D do not know an updated key of node 1.

Figure 9:
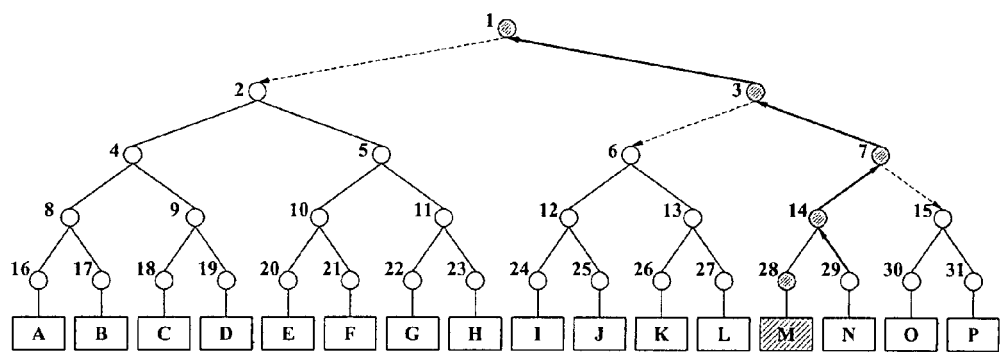
FIG. 9 is a diagram illustrating a group corresponding to another example of a fixed binary tree.

FIG. 9 is a diagram illustrating a group corresponding to another example of a fixed binary tree.

Referring to FIG. 9, node 14 is established as an update start node, and an update path is formed from node 14 to node 1, passing through nodes 7 and 3 when a member M leaves the group.

In this case, node 29 remains as a node corresponding to a member N.

When the member M leaves the group, node 28 becomes a disjoin node, and the update start node 14 is updated by a node key of node 29.

In this case, the node key of node 14 may be established as an output of a one-way function with respect to the node key of node 29.

A node key of node 7 is established as an output of the one-way function with respect to the node key of node 14, a node key of node 3 is established as an output of the one-way function with respect to the updated node key of node 7, and a node key of node 1 is established as an output of the one-way function with respect to the updated node key of node 3.

In this case, members O and P corresponding to descendent nodes of node 15 are provided the updated node key of node 7 from a server since the members O and P do not know the updated node key of node 7. In this case, the updated node key of node 7 is encrypted to be transmitted to node 15. The members O and P may sequentially calculate keys of nodes 3 and 1 using the transmitted node key of node 7.

In this case, members I, J, K, and L corresponding to descendents nodes of node 6 are provided the updated node key of node 3 since the members I, J, K, and L do not know the updated node key of node 3. In this case, the updated node key of node 3 is encrypted to be transmitted to node 6. The members I, J, K, and L may calculate the node key of node 1 using the transmitted node key of node 3.

In this case, members A through H corresponding to descendents nodes of node 2 are provided the updated node key of node 1 since the members A through H do not know the updated node key of node 1. In this case, the updated node key of node 1 is encrypted to be transmitted to node 2.

Figure 10:
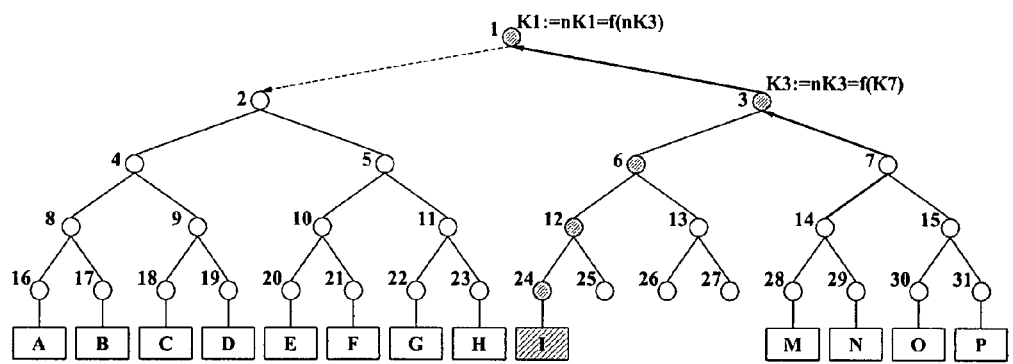
FIG. 10 is a diagram illustrating another group corresponding to another example of a fixed binary tree.

FIG. 10 is a diagram illustrating another group corresponding to another example of a fixed binary tree.

Referring to FIG. 10, node 3 is established as an update start node, and an update path is formed from node 3 to a node 1 when a member I leaves the group. Namely, node 3 is established as the update start node since node 3 is a node having a descendent node corresponding to a group member among ancestor nodes of the node which corresponds to the member I.

Node 24 becomes a disjoin node when the member I leaves the group, and the update start node 3 is updated by a node key of node 7.

In this case, the node key of node 3 may be established as an output of a one-way function with respect to the node key of node 7.

Also, a node key of node 1 may be established as an output of the one-way function with respect to the updated node key of node 3.

In this case, members A through H corresponding to descendents nodes of node 2 are provided an updated node key of node 1 since the members A through H do not know the updated node key of node 1. In this case, the updated node key of node 1 is encrypted to be transmitted to node 2.

In this case, keys with respect to nodes in a path from nodes 24 through 6 are managed to be updated in a server and the keys may be transmitted to a member joining the group when a corresponding node becomes a join node.

Figure 11:
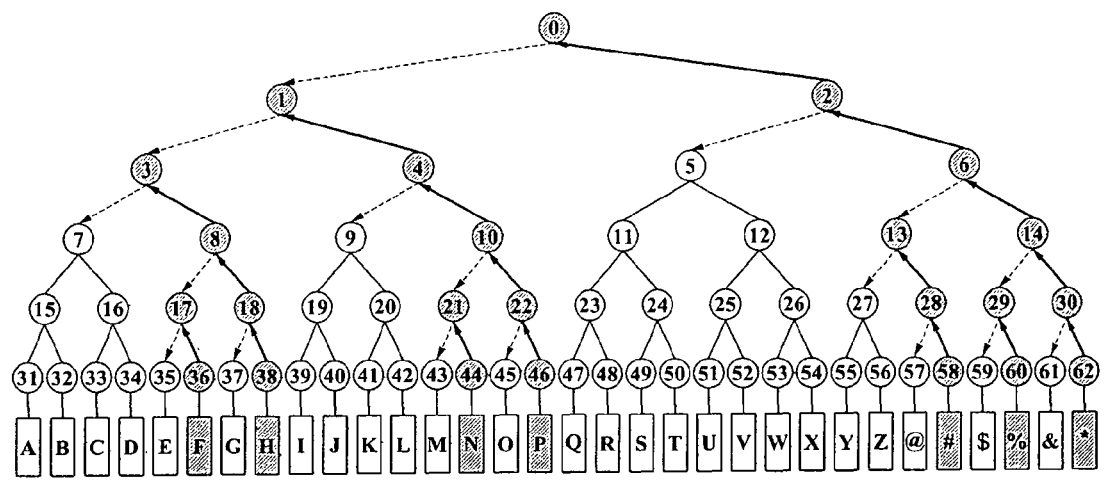
FIG. 11 is a diagram illustrating a binary tree when multi-joins occur according to an embodiment of the present invention.

FIG. 11 is a diagram illustrating a binary tree when multi-join occurs.

FIG. 11 indicates a change of the binary tree when new members F, H, N, P, #, %, and * simultaneously join a group.

Referring to FIG. 11, a thick solid line indicates a self-update path, and a dotted line indicates an update path for transmitting keys from a server.

In this case, the members F, H, N, P, #, %, and * may be new members simultaneously joining the group via a batch processing.

A parent node may have at least two updated child nodes when at least two new members join the group. For example, a parent node 14 of two nodes 29 and 30 is required to select which node key to update, from the node keys of nodes 29 and 30, since both of the two nodes 29 and 30 are updated in FIG. 11.

As illustrated in FIG. 11, when updating a specific parent node, and when both of two child nodes are updated, a node having a greater node ID number than the other, from both the two child nodes, may be established as an update use node. Namely, when updating node 14 in FIG. 11, node 30, from nodes 29 and 30, may be established as the update use node. In this case, node 14 is updated using a node key of node 30 of the update use node.

As another example, when updating a specific parent node, and when both of the two child nodes are updated, a node having a smaller node ID number than the other, from both of the two child nodes, may be established as the update use node. For example, when updating node 14 in FIG. 11, node 29, from nodes 29 and 30, may be established as the update use node.

Hereinafter, the example illustrated in FIG. 11 will be described in detail.

A node key of a leaf node 62 which corresponds to the new member * joining the group is established as a key of the member *.

When the key of leaf node 62 is updated, a key of node 30 is updated using the key of leaf node 62. In this case, the key of node 30 may be established as an output of a one-way function with respect to the node key of leaf node 62. Also, a server may encrypt the updated key of the node 30 to transmit to member & since the member &, corresponding to node 61, does not know the updated key of node 30. In this case, the updated key of node 30 is encrypted to transmit to node 61.

When the node key of node 30 is updated, it is determined whether a node key of node 14 is updated using the updated key of node 30. This is because a node key of node 29, that is another child node of node 14, is updated. In FIG. 11, node 14 establishes child node 30, having a greater node ID number than node 29, as an update use node, and updates a node key of its own using the node key of node 30. In this case, the node key of node 14 may be established as an output of the one-way function with respect to the node key of node 30.

Also, a server may encrypt the updated key of node 14 to transmit to members $ and % corresponding to descendent nodes of node 29 since the members $ and % do not know the updated key of the node 14.

When the node key of node 14 is updated, it is determined whether a node key of node 6 uses the updated key of node 14. This is because a node key of node 13, that is another child node of the node 6, is updated. In FIG. 11, node 6 establishes child node 14, having a greater node ID number, as an update use node, and updates the node key of its own using the node key of node 14. In this case, the node key of node 6 may be established as an output of the one-way function with respect to the node key of node 14.

Also, the server may encrypt the updated key of node 14 to transmit to members Y, Z, @, and # corresponding to the descendent nodes of node 13 since the members Y, Z, @, and # do not know the updated key of node 6.

When the node key of node 6 is updated, a node key of node 2 is updated using the updated key of node 6. In this case, the node key of node 2 is updated using the node key of node 6, which is the updated child node, since a node 5, that is another child node of the node 2, is not updated. In this case, the server may encrypt the updated key of the node 2 to transmit to members corresponding to descendent nodes of node 5.

When the node key of node 2 is updated, it is determined whether a node key of node 0 is updated using the updated node key of node 2. This is because a node key of node 1, which is another child node of node 0, is updated. In FIG. 11, node 0 establishes child node 2, having a greater node ID number, as an update use node, and updates the node key of its own using a node key of node 2. In this case, the node key of node 0 may be established as an output of the one-way function with respect to the node key of node 2.

Herein, the server may encrypt the key of node 0 to transmit to members corresponding to the descendents nodes of node 1.

Namely, as illustrated in FIG. 11, when both of two child nodes are updated, and a parent node establishes one child node of the two child nodes as an update use node via a predetermined rule, the parent node updates a node key of its own using a node key of the update use node.

Figure 12:
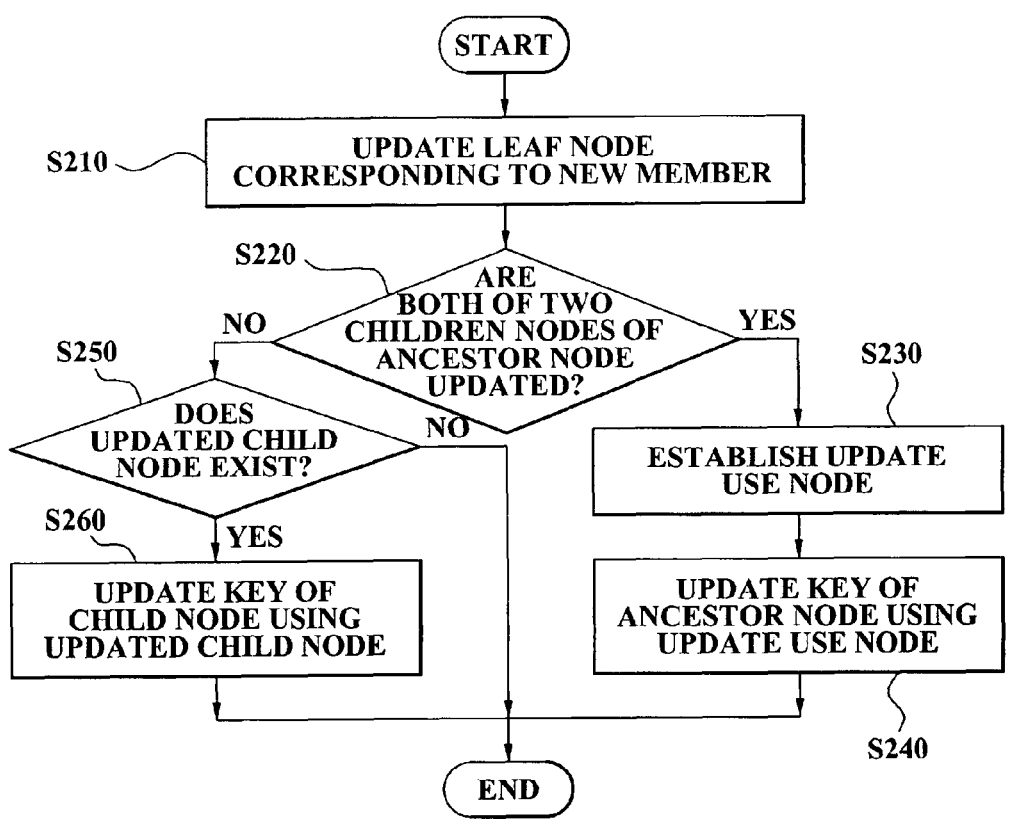
FIG. 12 is a flowchart illustrating a method of updating a group key according to an embodiment of the present invention.

FIG. 12 is a flowchart illustrating a method of updating a group key according to an embodiment of the present invention.

Referring to FIG. 12, in operation S210 the method of updating a group key of the group corresponding to a binary tree according to the embodiment of the present invention updates keys of leaf nodes corresponding to a new member, in response to a join of at least two new members joining the group.

Herein, the at least two new members may join the group via a batch processing.

In this case, the leaf nodes corresponding to the new member may be respectively generated by splitting at least one leaf node of the binary tree, having a node ID number that is a minimum or a maximum, when the binary tree is a complete binary tree.

According to the embodiment of the present invention, the leaf nodes which correspond to the new member may be respectively generated by splitting at least one leaf node, having a node ID number that is a minimum or a maximum from node IDs where a depth of the leaf nodes is minimum, when the binary tree is not a complete binary tree.

In this case, operation S210 may establish a member key of the new member as the keys of the leaf nodes.

Also, in operation S220, the method of updating the group key according to the embodiment of the present invention determines whether both of two child nodes of a single ancestor node are updated when updating a key of the ancestor node of the leaf nodes.

Specifically, since a join process with respect to at least two nodes may be simultaneously performed, operation S220 determines whether all child nodes of a corresponding node are updated when updating the node key of a specific node.

As the determination result of operation S220, when it is determined both of the two child nodes are updated, the method of updating the group key according to an embodiment of the present invention establishes, in operation S230, one of the two child nodes as an update use node when both the two child nodes are updated.

In this case, operation S230 may establish one of the two child nodes as the update use node after comparing a node ID number of the two child nodes. For example, operation S230 may establish a node, having a greater node ID number than the other node, as the update use node. For example, operation S230 may establish a node, having a smaller node ID number than the other node, as the update use node.

Also, in operation S240, the method of updating the group key according to the embodiment of the present invention updates a key of the parent node using the updating node.

In this case, operation S240 may establish an output of a one-way function with respect to a node key of the update use node as the key of the ancestor node.

Herein, the one-way function may receive the key and update information of the update use node.

As the determination result of operation S220, when it is determined both the two child nodes are not updated, the method of updating the group key according to an embodiment of the present invention determines, in operation S250, whether one of the two child nodes is updated.

As the determination result of operation S250, when it is determined one of the two child nodes is updated, the method of updating the group key according to an embodiment of the present invention updates a node key of the ancestor using the updated child nodes in operation S260.

Although it is not illustrated in FIG. 12, the method of updating the group key according to an embodiment of the present invention may further include encrypting the key of the ancestor node to transmit to a group member corresponding to a node other than the update use node. In this case, the encrypted key of the ancestor node is transmitted to the group member corresponding to a node, other than the update use node.

Figure 13:
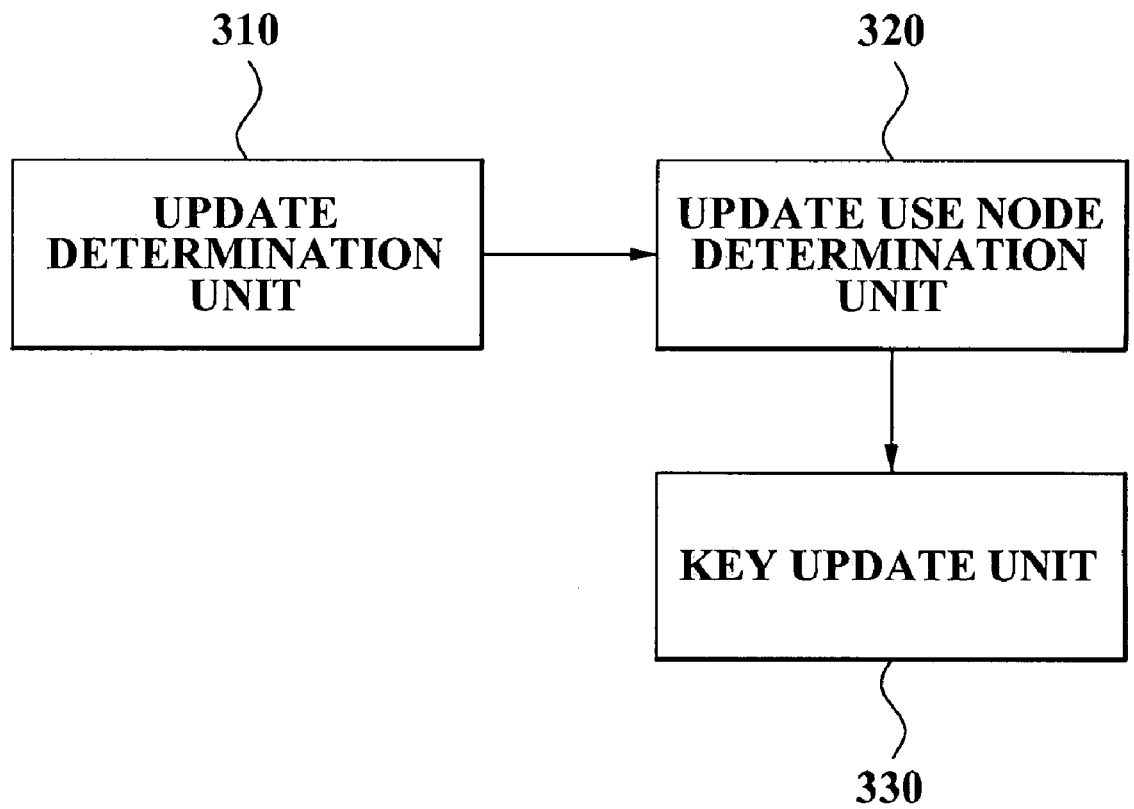
FIG. 13 is a block diagram illustrating an apparatus of updating a group key according to an embodiment of the present invention.

FIG. 13 is a block diagram illustrating an apparatus for updating a group key according to an embodiment of the present invention.

Referring to FIG. 13, the apparatus of updating the group key according to an embodiment of the present invention includes an update determination unit 310, an update use node determination unit 320 and a key update unit 330.

The update determination unit 310 determines whether two child nodes of a single ancestor node are both updated when updating a key of an ancestor node of the leaf nodes, in response to at least two new members joining the group.

The update use node determination unit 320 determines one of the two child nodes as the update use node when the two child nodes are both updated.

The key update unit 330 updates the key of the ancestor node using the update use node.

Although it is not illustrated in FIG. 13, the apparatus for updating the group key according to an embodiment of the present invention may further include a key transmitting unit for encrypting the key of the ancestor node to transmit to a group member corresponding to a node other than the update use node. In this case, the key transmitting unit may encrypt the key of the ancestor node to transmit to the node other than the update use node.

Further detailed description regarding the units of FIG. 13 will be omitted since it is described in detail with reference to FIGS. 1 through 12.

The method of updating a group key of a group which corresponds to a binary tree according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

The method and the apparatus for updating a group key of an exemplary embodiment of the present invention may effectively perform a self-update.

Also, the method and the apparatus for updating a group key of an exemplary embodiment of the present invention may simultaneously update a group key by accumulating a predetermined number of join requests, or by accumulating the join requests for a predetermined time.

Also, the method and the apparatus for updating a group key of an exemplary embodiment of the present invention may effectively provide a group member of a contents server, incapable of performing a self-update, with a required group key.

Also, the method and the apparatus for updating a group key of an exemplary embodiment of the present invention may effectively select a node which requires a self-update, and may perform updating of a group key with respect to the selected node.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of updating a group key of a group which corresponds to a binary tree, the method comprising:
   updating keys of leaf nodes which correspond to new members, in response to a join of at least two new members joining the group;
   determining that two child nodes of a single ancestor node are updated when updating a key of the single ancestor node of the leaf nodes;
   selecting one of the two child nodes as an update use node; and
   updating a key of the ancestor node based on a key of the update use node and not based on a key of the unselected child node.

2. The method of claim 1, wherein the at least two new members join the group via a batch processing.

3. The method of claim 1, wherein the selecting of the one of the two child nodes as the update use node comprises comparing node identification (ID) numbers of the two child nodes and selecting a child node having a higher ID number or a lower ID number as the update use node.

4. The method of claim 1, further comprising:
   encrypting the key of the ancestor node for transmittal to a group member corresponding to the unselected child node.

5. The method of claim 4, wherein the encrypting of the key of the ancestor node further comprises transmitting the key of the ancestor node to the group member corresponding to the unselected child node.

6. The method of claim 1, wherein the updating of the key of the ancestor node establishes an output of a one-way function with respect to the key of the update use node as the key of the ancestor node.

7. The method of claim 6, wherein the one-way function receives the key of the update use node and update information.

8. The method of claim 1, wherein the leaf nodes that correspond to the new members are respectively generated by splitting at least one leaf node of the binary tree, the split node having a node ID number that is a minimum or a maximum when the binary tree is a complete binary tree.

9. The method of claim 1, wherein the leaf nodes that correspond to the new members are respectively generated by splitting at least one leaf node having a node ID number that is a minimum or a maximum, from node IDs where a depth of the leaf nodes is minimum, when the binary tree is not a complete binary tree.

10. The method of claim 1, wherein the updating of the keys of the leaf nodes corresponding to the new members establishes a member key of the new members as the keys of the leaf nodes.

11. A non-transitory computer-readable storage medium storing a program for implementing a method of updating a group key of a group which corresponds to a binary tree, the method comprising:
   updating keys of leaf nodes corresponding to new members in response to a join of at least two new members joining the group;
   determining that two child nodes of a single ancestor node are updated when updating a key of the ancestor node of the leaf nodes;
   selecting one of the two child nodes as an update use node; and
   updating a key of the ancestor node based on a key of the update use node and not based on a key of the unselected child node.

12. An apparatus for updating a group key of a group corresponding to a binary tree, the apparatus comprising:
   an update determination unit configured to determine that two child nodes of a single ancestor node are both updated when updating a key of the ancestor node of the leaf nodes, in response to at least two new members joining the group;
   an update use node determination unit configured to select one of the two child nodes as the update use node;
   a key update unit configured to update the key of the ancestor node based on a key of the update use node and not based on a key of the unselected child node: and
   a computer processor configured to process the update determination unit, the update use node determination unit, and the key updated unit.

13. The apparatus of claim 12, wherein the at least two new members join the group via a batch processing.

14. The apparatus of claim 12, wherein the update use node determination unit is configured to select one of the two child nodes as the update use node by comparing node ID numbers of the two child nodes and selecting a child node having a higher ID number or a lower ID number as the update use node.

15. The apparatus of claim 12, further comprising:
   a key transmitting unit configured to encrypt the key of the ancestor node for transmittal to a group member corresponding to the unselected child node.

16. The apparatus of claim 15, wherein the key transmitting unit encrypts the key of the ancestor node and transmits the key of the ancestor node to the unselected child node.

17. The apparatus of claim 12, wherein the key update unit establishes an output of a one-way function with respect to the key of the update use node as the key of the ancestor node.

18. The apparatus of claim 17, wherein the one-way function receives the key of the update use node and update information.

19. The apparatus of claim 12, wherein the leaf nodes, having a key that is updated, are respectively generated by splitting at least one leaf node of the binary tree having a node ID number that is a minimum or a maximum, when the binary tree is a complete binary tree.

20. The apparatus of claim 12, wherein the leaf nodes, having the key that is updated, are respectively generated by splitting at least one leaf node, having a node ID number that is a minimum or a maximum from node IDs where a depth of the leaf nodes is minimum, when the binary tree is not a complete binary tree.

21. The apparatus of claim 12, wherein the leaf nodes having the key that is updated, establishes a member key of the new member as the keys of the leaf nodes.

* * * * *